United States Patent [19]
Harada et al.

[11] Patent Number: 5,435,637
[45] Date of Patent: Jul. 25, 1995

[54] HYDRAULIC BRAKE CONTROL SYSTEM FOR VEHICLE

[75] Inventors: Tomoo Harada, Anjo; Makoto Imaeda, Okazaki, both of Japan

[73] Assignee: Nippondenso Co., Ltd., Kariya, Japan

[21] Appl. No.: 136,002

[22] Filed: Oct. 14, 1993

[30] Foreign Application Priority Data

Oct. 14, 1992 [JP] Japan ................................ 4-302890

[51] Int. Cl.⁶ .................................. B60T 8/32
[52] U.S. Cl. ........................ 303/116.4; 303/10; 303/61; 303/115.2; 303/116.1; 303/68
[58] Field of Search ............... 303/116.4, 116.3, 116.1, 303/116.2, 117.1, 119.1, 10–12, 61–63, 115.2, 115.1, 113.1, 113.2, 68–69; 188/181 A, 181 R

[56] References Cited

U.S. PATENT DOCUMENTS

| | | | |
|---|---|---|---|
| 3,574,416 | 4/1971 | Skoyles | 303/61 X |
| 3,645,584 | 2/1972 | Leiber et al. | 303/116.4 |
| 3,756,666 | 9/1973 | Leiber | 303/116.4 X |
| 3,951,465 | 4/1976 | Stage | 303/61 X |
| 4,536,041 | 8/1985 | Kosolapov et al. | 303/116.3 |
| 4,568,131 | 2/1986 | Blomberg et al. | 303/61 X |
| 4,580,848 | 4/1986 | Widmer | 303/116.4 |
| 4,875,741 | 10/1989 | Ozawa et al. | 303/116.4 |
| 4,883,327 | 11/1989 | Farr | 303/61 X |
| 4,887,870 | 12/1989 | Siegel | 303/116.4 |
| 4,892,363 | 1/1990 | Burgdorf | 303/116.4 |
| 5,031,969 | 7/1991 | Siegel . | |
| 5,131,730 | 7/1992 | Kollers et al. . | |

FOREIGN PATENT DOCUMENTS

| | | | |
|---|---|---|---|
| 0332398 | 9/1989 | European Pat. Off. . | |
| 265864 | 3/1989 | Germany | 303/116.4 |
| 62-187645 | 8/1987 | Japan | 303/10 |
| 1132449 | 5/1989 | Japan . | |
| 1289748 | 11/1989 | Japan . | |
| 1297350 | 11/1989 | Japan . | |
| 254769 | 4/1990 | Japan . | |
| 266362 | 5/1990 | Japan . | |
| 2234868 | 9/1990 | Japan . | |
| 1500056 | 2/1978 | United Kingdom . | |

*Primary Examiner*—Douglas C. Butler
*Attorney, Agent, or Firm*—Cushman, Darby & Cushman

[57] ABSTRACT

A hydraulic brake control system for a vehicle includes a return line for reducing a pressure built up in a wheel cylinder. The return line includes therein a switching valve for opening and blocking the return line. The return line further includes therein cylinders each having therein a piston for defining a piston chamber therein. Each piston has a first state where a brake fluid flowing from the wheel cylinder via the switching valve is allowed to flow into the piston chamber, and a second state where the brake fluid is allowed to be discharged from the piston chamber so as to be returned to a master cylinder. An operation control mechanism is provided for controlling the pistons into the first states and the second states, respectively, at different timings from each other in turn.

24 Claims, 9 Drawing Sheets

HYDRAULIC BRAKE CONTROL SYSTEM FOR VEHICLE

BACKGROUND OF THE INVENTION

1. Field of the Invention

The present invention relates to a hydraulic brake control system for a vehicle with, such as, an anti-lock or anti-skid brake system and/or a traction control system.

2. Description of the Prior Art

U.S. Pat. No. 5,031,969, and its corresponding Japanese Unexamined Patent Publication No. 2-234868, disclose a device for controlling hydraulic pressure in a hydraulic system, such as, a vehicular hydraulic brake system with a skid control system. The disclosed device includes, as the characteristic structure, a throttle switching valve interposed between a buffer chamber and a brake master cylinder, and a buffer means provided in the buffer chamber is formed by a preloaded spring-biased device.

In another system, Japanese Unexamined Utility Model Publication No. 2-54769 discloses an anti-skid brake system, wherein an accumulator is provided for accumulating brake fluid. The brake fluid is first pumped from a reservoir tank to the accumulator and then returned to a first hydraulic line extending between a brake master cylinder and a brake wheel cylinder. The disclosed system further includes a variable throttle in the first hydraulic line which changes its throttling degree depending on the displacement of the piston of the accumulator.

The foregoing conventional techniques are aimed respectively at eliminating pulsation transmitted to a brake pedal due to hydraulic pressure fluctuation caused by. However, large noises generated by the pump being driven at a relatively high speed still remains a problem.

Specifically, in the conventional systems, the reciprocating pump piston operates at about 60 Hz. Consequently, large noises are generated at integral multiples of the fundamental frequency 60 Hz so as to vibrate the air in audible frequency band.

Accordingly, to suppress effectively the noise induced by the operation of the pump, it is advantageous to prolong the period of the reciprocating piston. In other words reducing the frequency of the reciprocating piston by decreasing the speed of the pump, reduces the pump-induced vibration to less than the audible frequency band.

However, in conventional systems, the pump speed can not be decreased, i.e. the period of the reciprocating piston can not be increased due to the following reasons:

An oil consumption quantity or hydraulic consumption $Q_S$ (cm$^3$) and a theoretical discharge rate $q$ (cm$^3$/sec) of the pump in an anti-lock brake system are preset respectively according to a vehicle specification. The hydraulic consumption $Q_S$ represents a sum of the reservoir capacity $Q_R$ (cm$^3$) and a pump chamber capacity (cm$^3$). Accordingly, if the period of the reciprocating piston is prolonged, a hydraulic discharge quantity for each piston discharge stroke should be increased to satisfy the preset theoretical discharge rate $q$. This increase in each piston discharge quantity increases the hydraulic quantity flowing into the pump chamber such that the hydraulic consumption $Q_S$ becomes greater than the preset value. This consequence is significant when the hydraulic fluid flowing into the pump chamber supplies the chamber's maximum capacity. On the other hand, if the reservoir capacity $Q_R$ is decreased to prevent the hydraulic consumption $Q_S$ from becoming greater than the preset value, the hydraulic consumption $Q_S$ becomes smaller than the preset value. This consequence is significant when the hydraulic fluid flowing into the pump chamber supplies only the chamber's minimum capacity.

When the hydraulic consumption $Q_S$ becomes greater than the preset value, the following problem occurs:

When a failure occurs, for example, at a pressure-reduction valve to thereby establish communication between the master cylinder and the pressure-reduction system, braking becomes inoperative when the brake pedal bottoms to disable the pressure buildup in the master cylinder.

On the other hand, when the hydraulic consumption $Q_S$ becomes smaller than the preset value, the following problem occurs:

When a wheel is locked during braking a pressure-reduction valve is opened to remove the brake fluid in a corresponding wheel cylinder thereby releasing the locked wheel. Yet, when the hydraulic consumption $Q_S$ is smaller than the preset value, the brake fluid to be removed becomes smaller so that the pressure-reduction performance needed to release the locked wheel is lowered.

SUMMARY OF THE INVENTION

Therefore, it is an object of the present invention to provide an improved hydraulic brake control system for a vehicle.

According to one aspect of the present invention, a hydraulic brake control system for a vehicle comprises a brake line for establishing communication between a master cylinder and a wheel cylinder; a return line bypassing at least a portion of the brake line; switching valve means for opening and closing the brake line and the return line; a plurality of pistons arranged in the return line, the pistons each having a working state and a non-working state for allowing a brake fluid flowing from the switching valve means to be temporarily stored in a corresponding piston chamber when the piston is in the non-working state and for allowing the brake fluid to be discharged from the piston chamber under pressure so as to flow into the master cylinder when the piston is in the working state; and operation control means for controlling the pistons into the working states and the non-working states, respectively, in a predetermined order.

According to another aspect of the present invention, a hydraulic brake control system for a vehicle comprises a brake line extending from a master cylinder to a wheel cylinder for applying a pressure in the master cylinder to the wheel cylinder; a return line extending from the wheel cylinder to the master cylinder for a pressure reduction in the wheel cylinder; switching valve means for opening and closing the brake line and the return line; cylinders arranged in the return line; pistons each movably disposed in corresponding cylinders for defining a piston chamber therein, each of the pistons having a first state where a brake fluid flowing from the wheel cylinder via the switching valve means is allowed to flow into the piston chamber, and a second state where the brake fluid is allowed to be discharged from the piston chamber so as to flow into the master cylinder; and operation control means for controlling the pistons into the first states and the second states, respectively, at different timings in turn.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings.

DESCRIPTION OF THE PREFERRED EMBODIMENT

Now, preferred embodiments of the present invention will be described hereinbelow with reference to the accompanying drawings.

Figure 1:
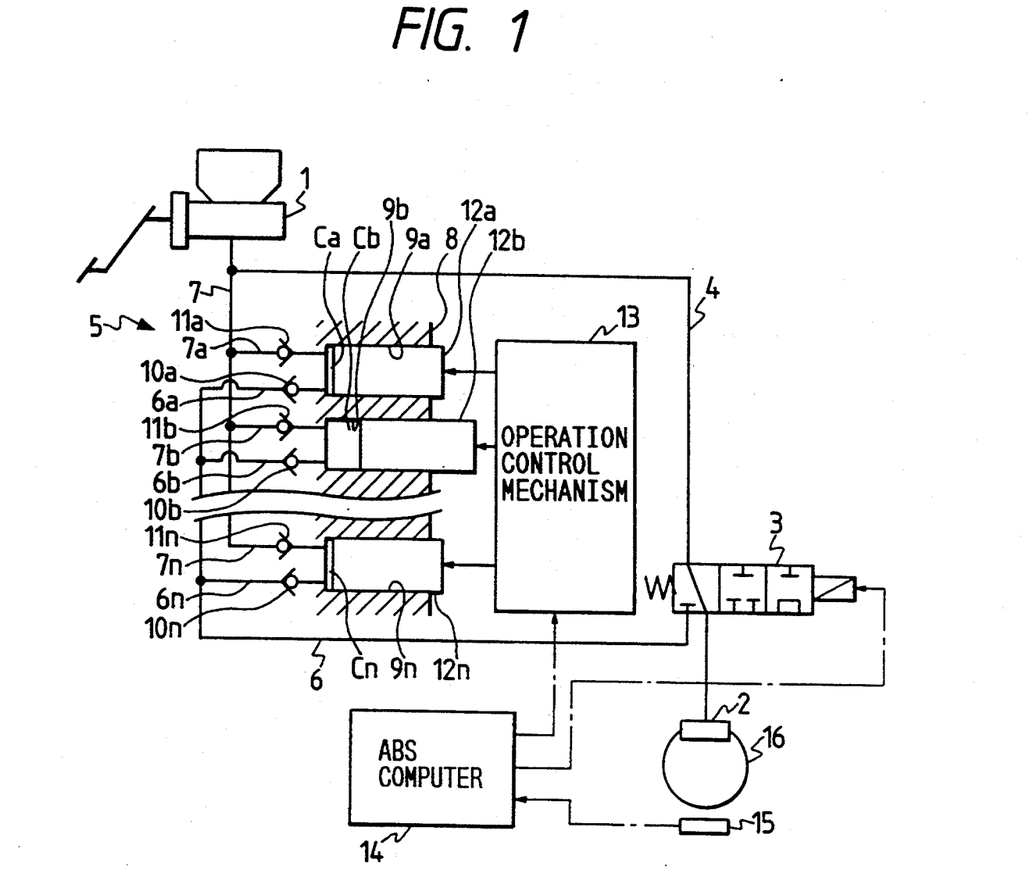
FIG. 1 is a schematic hydraulic circuit diagram showing a hydraulic brake control system for a vehicle with an anti-lock brake system according to a first preferred embodiment of the present invention.

FIG. 1 is a schematic hydraulic circuit diagram showing a hydraulic brake control system for a vehicle with an anti-lock brake system (hereinafter referred to as "ABS"), according to a first preferred embodiment of the present invention.

In FIG. 1, a brake line 4 extends from a brake master cylinder 1 to a brake wheel cylinder 2 via an electromagnetic switching valve 3. A return line 5 is also formed extending from the wheel cylinder 2 to the master cylinder 1 via the switching valve 3 so as to partly bypass the brake line 4. The bypassing portion of the return line 5 includes a line 6 connected to the switching valve 3 and a line 7 connected to the brake line 4. The line 6 is forked into inflow branch lines 6a to 6n which are respectively connected via check valves or inflow valves 10a to 10n to cylinders 9a to 9n formed in a cylinder block 8. Similarly, the line 7 is forked into discharge branch lines 7a to 7n which are respectively connected via check valves or discharge valves 11a to 11n to the cylinders 9a to 9n. Accordingly, the cylinders 9a to 9n are arranged in parallel with each other.

Pistons 12a to 12n are slidably received in the corresponding cylinders 9a to 9pn, respectively, so as to form a return pump. These pistons 12a to 12n are respectively controlled into working states and non-working states in predetermined sequence or order by means of an operation control mechanism 13 during an ABS control mode, which will be described later in detail. An ABS computer 14 performs calculation according to a prestored control program with inputs, such as, a speed of a wheel 16 monitored by a wheel speed sensor 15. The ABS computer 14, based on a result of the calculation, outputs control signals to the switching valve 3 and the operation control mechanism 13 so as to perform the ABS control.

Now, the basic operation of the hydraulic brake control system as structured above will be briefly explained hereinbelow.

(1) Under a normal brake mode (not under the ABS control mode) or during a pressure buildup in the wheel cylinder 2 under the ABS control mode:

The switching valve 3 assumes a position as shown in FIG. 1 so that the master cylinder 1 and the wheel cylinder 2 are in fluid communication with each other via the brake line 4. On the other hand, the switching valve 3 blocks the return line 5. In this condition, since the brake fluid is prevented from entering piston chambers or working chambers Ca to Cn of any of the cylinders 9a to 9n due to the one-way checking function of each of the discharge valves 11a to 11n, a pressure in the master cylinder 1 is directly applied to the wheel cylinder 2.

(2) During a pressure holding in the wheel cylinder 2 under the ABS control mode:

The switching valve 3 assumes a position to block both the brake line 4 and the return line 5 so that a pressure in the wheel cylinder 2 is held constant.

(3) During a pressure reduction in the wheel cylinder 2 under the ABS control mode:

The switching valve 3 assumes a position where the brake line 4 is blocked while the line 6 of the return line 5 communicates with the wheel cylinder 2. As described above, under the ABS control mode, the operation control mechanism 13 controls the pistons 12a to 12n into the working states and the non-working states, respectively, at different timings in turn. As a result, the brake fluid which has flowed out of the wheel cylinder 2 flows, due to its hydraulic pressure, into the piston chambers of the cylinders whose pistons are in the non-working states, that is, whose pistons are not under discharge strokes. On the other hand, the brake fluid stored in the piston chambers Ca to Cn of the cylinders 9a to 9n is discharged in turn into the line 7 when the corresponding pistons 12a to 12n get into the working states to start the discharge strokes in turn. The brake fluid discharged into the line 7 is then returned to the master cylinder 1.

Figure 2A:
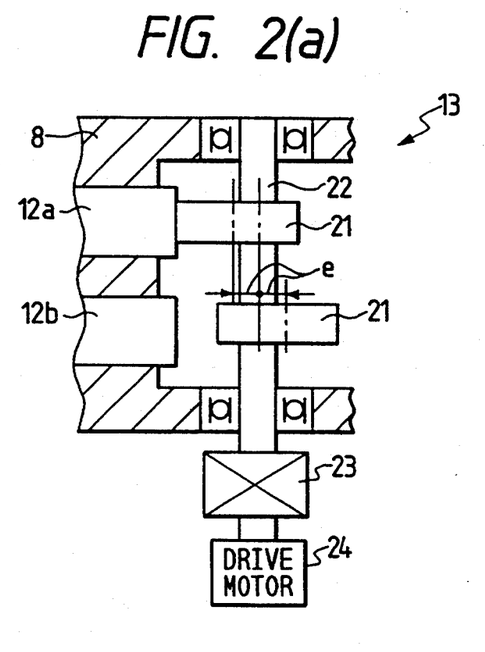
FIG. 2(a) is a schematic diagram showing a first example of a structure of an operation control mechanism as shown in FIG. 1.

FIG. 2(a) is a schematic diagram showing a first example of a structure of the operation control mechanism 13, wherein the operation control mechanism 13 is arranged to control two pistons 12a and 12b. In FIG. 2(a), the operation control mechanism 13 includes two eccentric cams 21, 21 each for actuating the corresponding one of the pistons 12a and 12b. Each eccentric cam 21 is firmly fitted onto a pump shaft 22 with an eccentric amount e being set to half (½) of a magnitude of the piston discharge stroke. Further, the eccentric cams 21, 21 are arranged on the shaft 22 with a mutual phase difference of eccentricity being set to $\pi$ (radian). This means that the pistons 12a and 12b are actuated with a phase difference of $\pi$ (radian) from each other with respect to the rotation of the shaft 22. The shaft 22 is coupled to a drive motor 24 via a reduction gear mechanism 23.

Figure 2B:
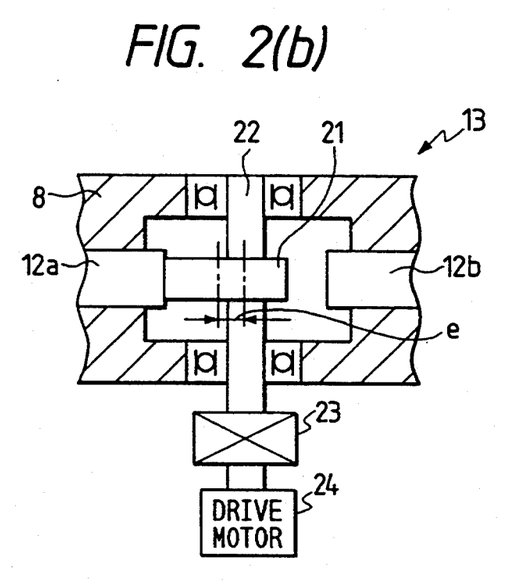
FIG. 2(b) is a schematic diagram showing a modification of the operation control mechanism as shown in FIG. 2(a)

FIG. 2(b) is a schematic diagram showing a modification of the operation control mechanism 13 in FIG. 2(a). As shown in FIG. 2(b), in this modification, the pistons 12a and 12b are arranged in opposite sides of the shaft 22 and on a line extending in perpendicular to the shaft 22. Accordingly, a single eccentric cam 21 is provided for actuating both the pistons 12a and 12b.

Figure 3:
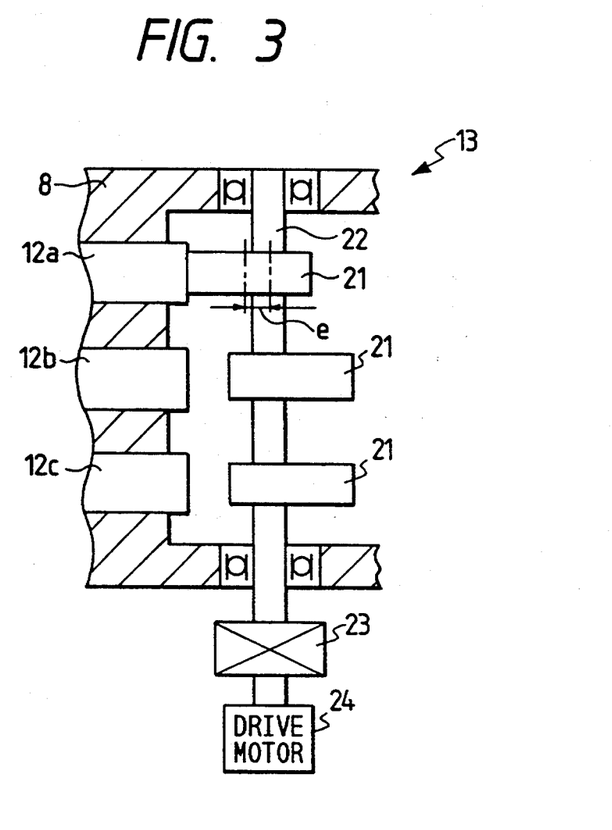
FIG. 3 is a schematic diagram showing a second example of a structure of the operation control mechanism as shown in FIG. 1.

FIG. 3 is a schematic diagram showing a second example of a structure of the operation control mechanism 13, wherein the operation control mechanism 13 is arranged to control three pistons 12a, 12b and 12c. In FIG. 3, the operation control mechanism 13 includes three eccentric cams 21, 21, 21 each for actuating the corresponding one of the pistons 12a, 12b and 12c. Each eccentric cam 21 is firmly fitted onto a pump shaft 22 with an eccentric amount e being set to half (½) of a magnitude of the piston discharge stroke. Further, the eccentric cams 21, 21, 21 are arranged on the shaft 22 with a mutual phase difference of eccentricity being set to $2\pi/3$ (radian). This means that the pistons 12a, 12b and 12c are actuated with a phase difference of $2\pi/3$ (radian) from each other with respect to the rotation of the shaft 22. The shaft 22 is coupled to a drive motor 24 via a reduction gear mechanism 23.

Accordingly, assuming that the number of the pistons is N (N≧2), the eccentric cams are arranged so that the pistons are actuated with every phase difference of $2\pi/N$ (radian) with respect to the rotation of the shaft 22.

Figure 2C:
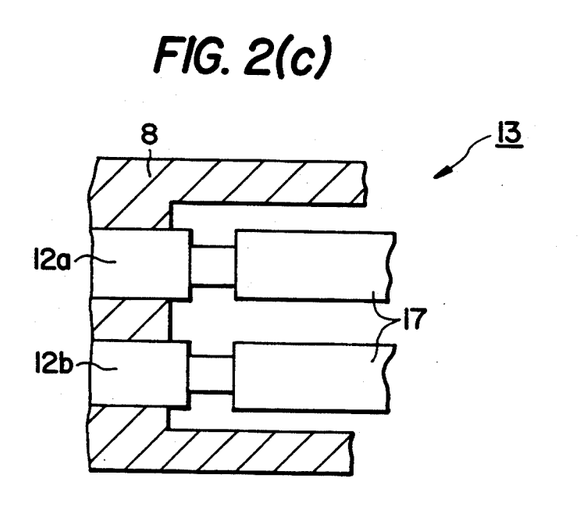
FIG. 2(c) is a schematic diagram showing another embodiment of the operation control mechanism.

The reduction gear mechanism 23 may be formed by, such as, a worm gear, a planetary gear, a differential planetary gear or a hypoid gear. Further, as shown in FIG. 2(c), the operation control mechanism 13 may also be formed by, for example, hydraulic cylinders 17 having different operation timings.

In the first preferred embodiment as described above, the piston chambers or the working chambers of the cylinders respectively work as reservoirs for the brake fluid flowing from the wheel cylinder 2 via the switching valve 3. Accordingly, a total reservoir capacity is a sum of capacities of the respective piston chambers. As appreciated, the Capacity of each piston chamber varies depending on a position of the piston in the corresponding cylinder. This means that, in the first preferred embodiment, the total reservoir capacity is defined by NAL/2 (cm³), wherein A represents a cross-sectional area (cm²) of each piston, L represents a magnitude of the piston discharge stroke (cm), and N represents the number of the pistons (N≧2). As described above, the pistons have a mutual phase difference of $2\pi/N$ (radian) in operation with respect to the rotation of the shaft 22.

Figure 4A:
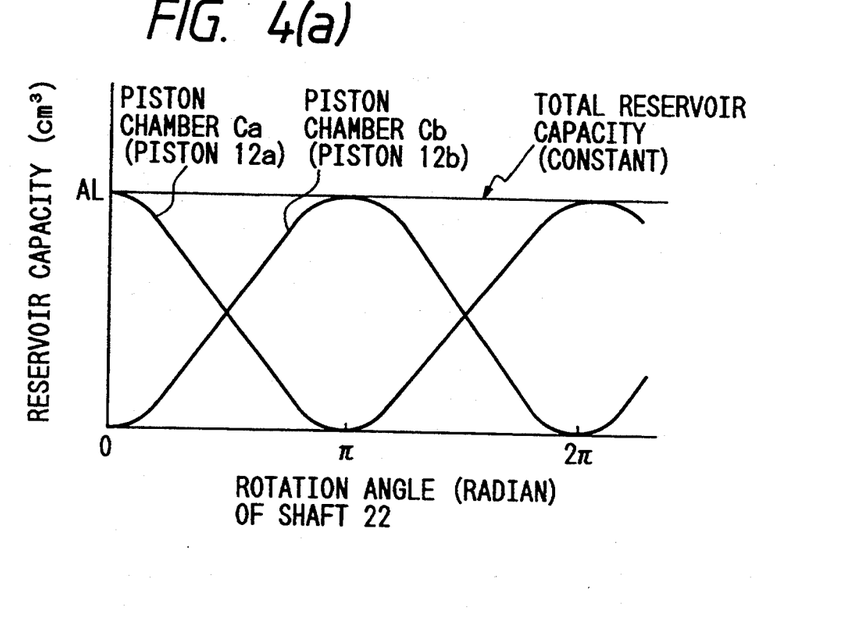
FIG. 4(a) is an explanatory diagram showing relation between a rotation angle of a pump shaft and capacities of two piston chambers working as reservoirs.
Figure 4B:
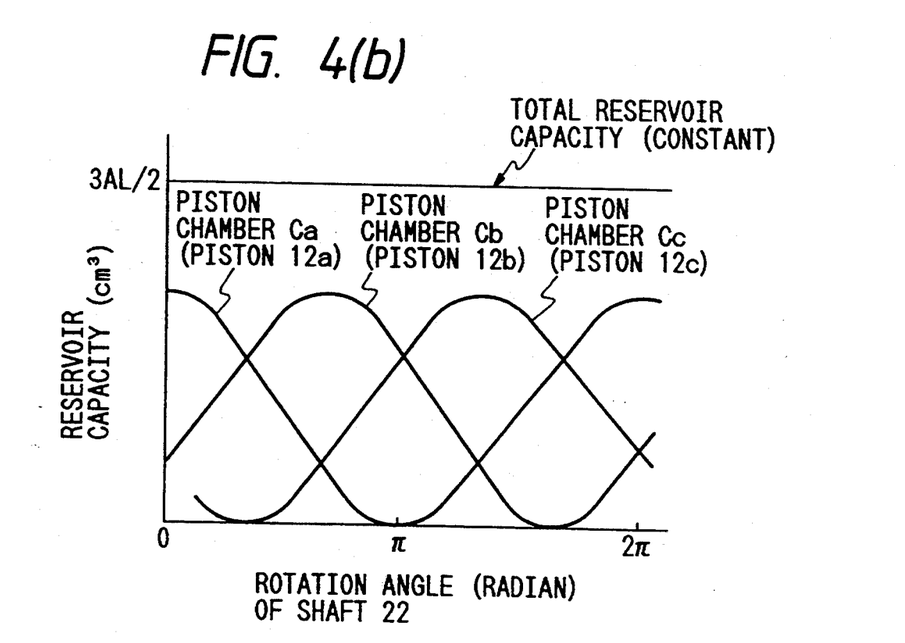
FIG. 4(b) is an explanatory diagram showing relation between a rotation angle of a pump shaft and capacities of three piston chambers working as reservoirs.

FIG. 4(a) is an explanatory diagram showing relation between a rotation angle (radian) of the shaft 22 and capacities of the piston chambers Ca and Cb as reservoirs, meaning that the number of the pistons is two. On the other hand, FIG. 4(b) is an explanatory diagram showing relation between a rotation angle (radian) of the shaft 22 and capacities of the piston chambers Ca, Cb and Cc as reservoirs, meaning that the number of the pistons is three. In FIGS. 4(a) and 4(b), the total reservoir capacity is derived as a sum of values on the vertical axis relative to the corresponding rotation angle of the shaft 22. Accordingly, the total reservoir capacity is AL (cm³) when the number of the pistons is two and 3AL/2 (cm³) when the number of the pistons is three, which are constant over all the rotation angles of the shaft 22.

The characteristics of FIGS. 4(a) and 4(b) have been derived using the eccentric cylindrical cams 21. On the other hand, a constant reservoir capacity can also be realized using, such as, uniform cams.

As described before, the hydraulic consumption $Q_S$ (cm³) and the theoretical discharge rate q (cm³/sec) of the pump in the pressure-reduction system in the ABS are respectively preset according to a specification of a vehicle. As appreciated from the foregoing description, in the first preferred embodiment, the hydraulic consumption $Q_S$ is equal to the total reservoir capacity defined by the sum of the piston chamber capacities. Accordingly, an equation of $Q_S$=NAL/2 (cm³) is established. On the other hand, a theoretical discharge amount per rotation of the shaft 22 becomes NAL (cm³/rotation). Accordingly, when the required theoretical discharge rate is q (cm³/sec), a rotational speed of the pump shaft 22 is set to q/NAL (rotation/sec).

Now, it is assumed that the hydraulic consumption (the total reservoir capacity in the first preferred embodiment) $Q_S$ and the theoretical discharge rate q are respectively set as $Q_S \approx 2.7$ (cm³) and q≈5.4 (cm³/sec). Since a theoretical discharge amount per rotation of the conventional ABS pump is about 0.1 (cm³/rotation), a rotation of the conventional ABS pump is about 0.1 (cm³/rotation), a rotational speed of the pump shaft should be about 54 (rotation/sec). On the other hand, in the first preferred embodiment with two pistons, a rotational speed of the pump shaft 22 is derived as follows:

$$q/2AL = 5.4/(2 \times 2.7) = 1 \text{ (rotation/sec)}$$

Figure 5:
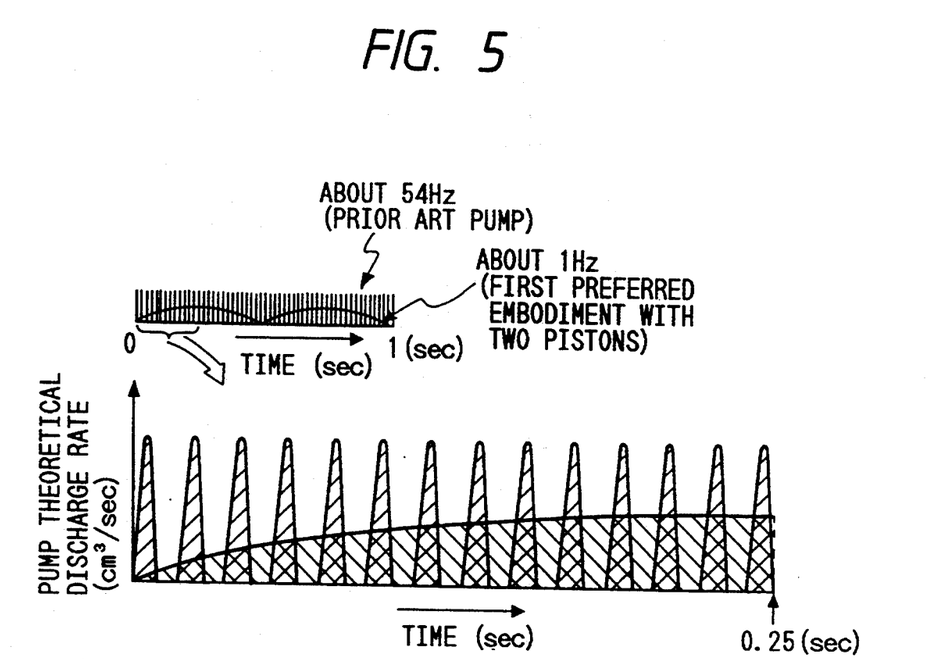
FIG. 5 is an explanatory diagram comparing discharge cycles of pumps between the prior art and the first preferred embodiment.

Accordingly, according to the first preferred embodiment with two pistons, the pump shaft can be rotated at a speed which is about 1/54 of that of the conventional ABS pump. As seen from FIG. 5 which compares discharge cycles of the pumps between the prior art and the first preferred embodiment, a discharge variation rate of the pump in the first preferred embodiment is significantly smaller than that in the prior art. As a result, pulsation or vibration, which is otherwise caused when the brake fluid is discharged from the pump, is effectively prevented so that the generation of noise is largely suppressed. Further, since pulsation reducing means, such as, a damper and an orifice can be eliminated, a size reduction of the system can be realized. Moreover, since no provision of the orifice facilitates load reduction for the pump and the drive motor, long-term durability and failure rate reduction of the system are also facilitated.

Figure 6:
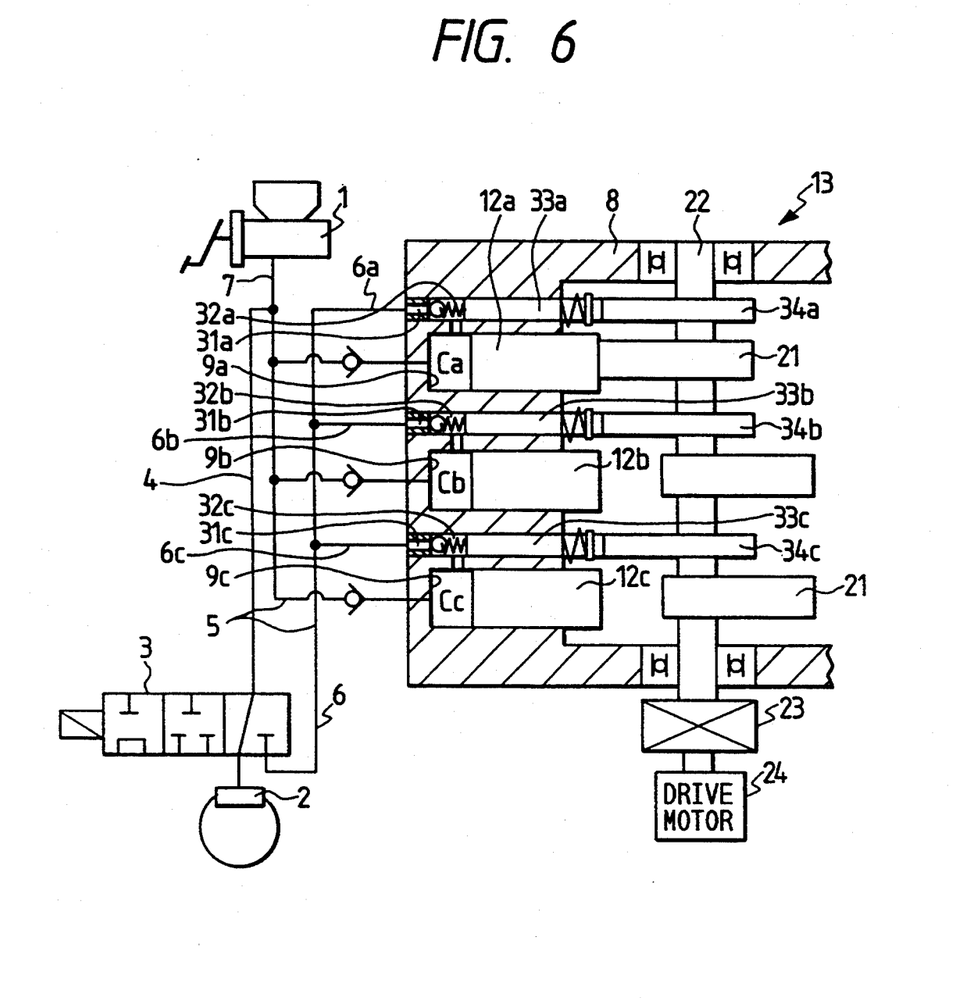
FIG. 6 is a schematic structural diagram showing a modification of the first preferred embodiment.

FIG. 6 shows a modification of the foregoing first preferred embodiment. In FIG. 6, the same or similar elements are designated by the same reference symbols as those in the first preferred embodiment so as to avoid a redundant disclosure. In FIG. 6, inflow valves 31a, 31b and 31c connected to the inflow branch lines 6a, 6b and 6c are incorporated in the cylinder block 8 so as to control valve opening pressures thereof. Specifically, The inflow valves 31a, 31b and 31c respectively include ball valves and corresponding valve springs 32a, 32b and 32c each of which biases the corresponding ball valve toward a valve closing position. Further, valve opening pressure adjusting pins 33a, 33b and 33c are respectively provided between the corresponding valve springs 32a, 32b and 32c and corresponding cams 34a, 34b and 34c which are firmly fitted onto the pump shaft 22. Accordingly, when the shaft 22 is driven to co-rotate the cams 34a, 34b and 34c, the valve opening pressure adjusting pins 33a, 33b and 33c follow contours of the corresponding cams so as to change set loads of the valve springs 32a, 32b and 32c. As a result, the valve opening pressures of the inflow valves 31a, 31b and 31c can be controlled according to arrangement of the cams 34a, 34b and 34c.

A radial passage is formed in the cylinder block 8 for each of the cylinders 9a, 9b and 9c so as to establish communication between each of the piston chambers Ca, Cb and Cc and the line 6 when the corresponding inflow valve is opened.

In the modification of FIG. 6, the brake fluid flowing in the line 6 of the return line 5 passes through the inflow valves 31a, 31b and 31c in order of smaller valve opening pressure. Specifically, the brake fluid first passes through the inflow valve having the smallest valve opening pressure, and then the inflow valve having a smaller valve opening pressure of the remaining two. Accordingly, by properly arranging the cams 34a, 34b and 34c in relation to rotation angles of the shaft 22, the brake fluid can select the cylinder whose piston is not pressed by the corresponding eccentric cam 21, i.e. whose piston is in the non-working state, so as to flow into the piston chamber of the selected cylinder.

Figure 7:
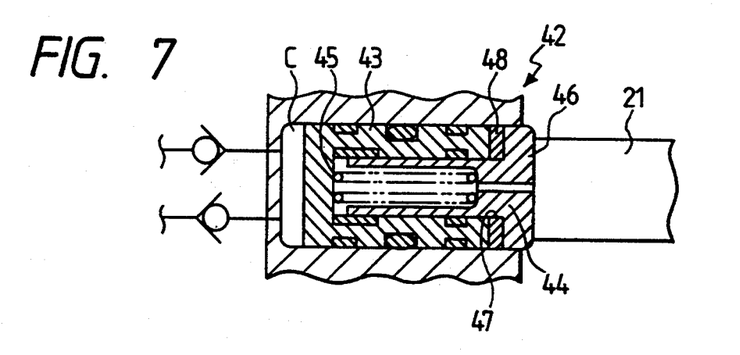
FIG. 7 is an enlarged sectional view showing a main portion of a further modification of the first preferred embodiment.

FIG. 7 shows a further modification of the first preferred embodiment. In this modification, a piston 42, corresponding to one of the pistons 12a to 12n in the first preferred embodiment, is formed by an outer sleeve member 43 and an inner plunger member 44 which is fitted into the outer sleeve member 43 with a compression spring 45 therebetween so as to bias the two members in opposite directions. Further, the inner plunger member 44 has a stepped shape formed by a smaller diameter portion 47 located within the outer sleeve member 43 and a lager diameter portion 46 which is in constant engagement with the eccentric cam 21 by means of the biasing force of the compression spring 45. A resinous buffer member 48 is mounted on the smaller diameter portion 47 and between the larger diameter portion 46 and the outer sleeve member 43.

In the modification of FIG. 7 as structured above, since the inner plunger member 44 is constantly in engagement with the eccentric cam 21, an impact between the piston 42 and the eccentric cam 21 is prevented. Further, in this modification, the brake fluid can enter the cylinder only when exerting a pressure greater than a value defined by F/A, wherein F represents a set spring force of the compression spring 45 and A represents a cross-sectional area of the piston 42. Accordingly, by changing the set spring force of the compression spring 45, the required pressure for the brake fluid to enter the cylinder (piston chamber C) can be set as occasion demands. This is particularly effective when another system, such as, a traction control system is added to the ABS.

Figure 8:
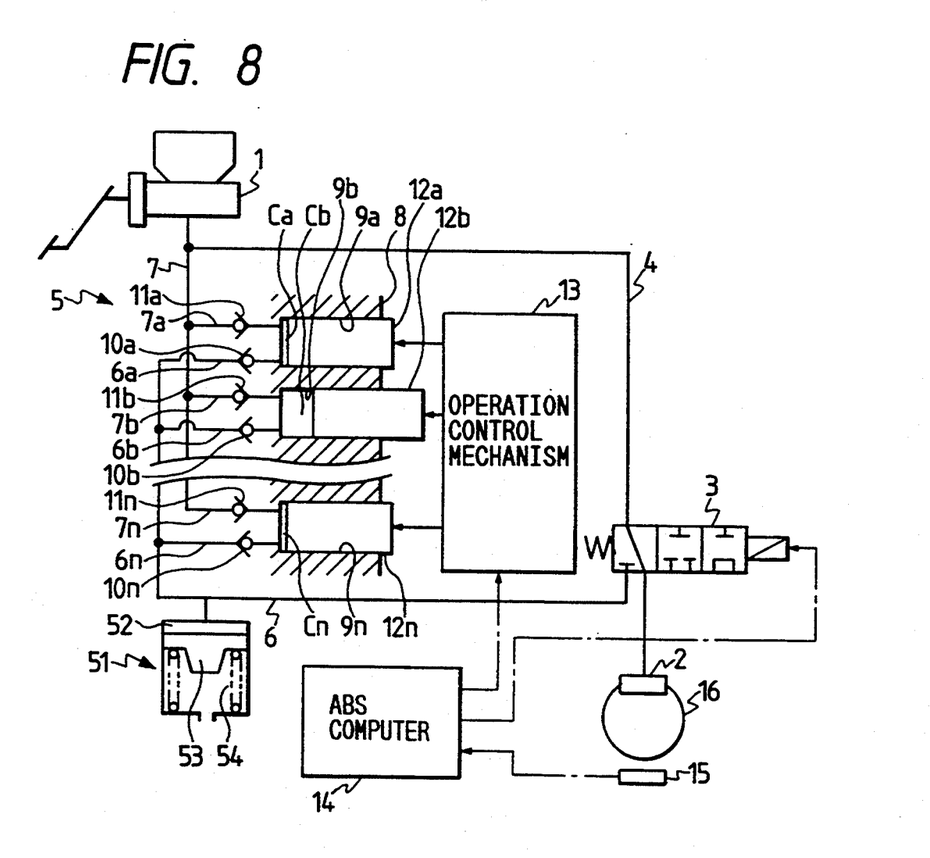
FIG. 8 is a schematic hydraulic circuit diagram showing a hydraulic brake control system for a vehicle with an anti-lock brake system according to a second preferred embodiment of the present invention.

Now, a second preferred embodiment of the present invention will be described with reference to FIG. 8. The second preferred embodiment only differs from the first preferred embodiment in that a reservoir 51 is additionally provided in the line 6 between the switching valve 3 and the pistons 12a to 12n. Accordingly, detailed description of the same or similar elements in the first preferred embodiment Will be omitted by assigning the same reference symbols as in the first preferred embodiment.

The reservoir 51 includes a reservoir tank 52. The reservoir tank 52 includes therein a piston member 53 and a compression spring 54 interposed between a bottom of the reservoir tank 52 and the piston member 53 so as to bias the piston member 53 toward a position where the piston member 53 blocks communication between the inside of the reservoir tank 52 and the line 6.

When the switching valve 3 is switched to assume a position to block the brake line 4 and establish communication between the line 6 of the return line 5 and the wheel cylinder 2 under the ABS control mode, a pressure in the wheel cylinder 2 starts to be reduced. At this time, the operation control mechanism 13 controls the pistons 12a to 12n into the working states and the non-working states, respectively, in the same manner as in the first preferred embodiment. The brake fluid flowing from the wheel cylinder 2 at first can not enter the reservoir tank 52 due to a biasing force of the compression spring 54 which biases the piston member 53 to reject the inflow of the brake fluid. The brake fluid then flows through the inflow branch lines to enter the piston chambers of the cylinders whose pistons are not at the discharge strokes, i.e. whose pistons are in the non-working states to allow the cylinders to perform reservoir function. On the other hand, the brake fluid is discharged from the cylinders in turn when the corresponding pistons are brought into the working states to start the discharge strokes in turn, so as to be returned to the master cylinder 1.

When the piston chambers of the cylinders which work as reservoirs this time are all filled up with the brake fluid, the brake fluid now flows into the reservoir tank 52 by depressing the piston member 53 of the reservoir 51. Subsequently, the brake fluid in the reservoir tank 52 is pressed out of the reservoir tank 52 by means of the biased piston member 53 so as to flow into the piston chamber of the cylinder whose piston has finished its discharge stroke to get into the non-working state.

In the second preferred embodiment as structured above, a minimum value of a hydraulic pressure to be generated by the spring force of the compression spring 54 should be set greater than a maximum value of a pressure required to allow the brake fluid to enter the piston chambers of the cylinders whose pistons are in the non-working states.

As appreciated, the provision of the reservoir 51 can decrease a value defined by A x Sd, wherein A represents a cross-sectional area of each of the pistons 12a to 12n and Sd represents a magnitude of a discharge stroke of each of the pistons 12a to 12n. Accordingly, a theoretical discharge amount per rotation of the shaft 22 can be reduced, and the size reduction in entire structure can be realized. Further, even when the preset hydraulic consumption differs depending on vehicle types, it can be dealt with only by changing a capacity of the reservoir 51, meaning that those elements in the system other than the reservoir 51 can be commonly used, resulting in cost reduction and simplification of the facilities.

Figure 9:
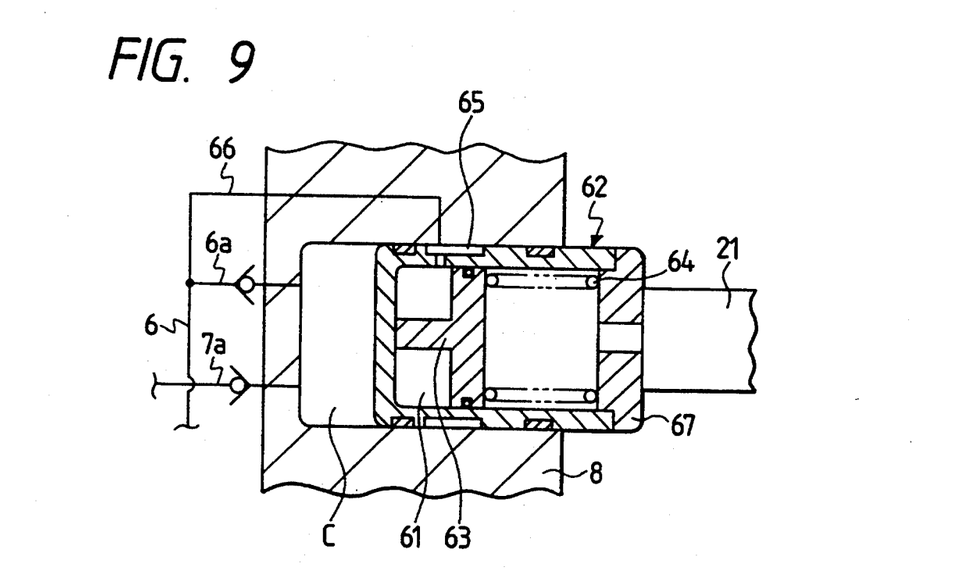
FIG. 9 is an enlarged sectional view showing a main portion of a modification of the second preferred embodiment.

FIG. 9 shows a modification of the second preferred embodiment. In this modification, instead of the reservoir 51, a reservoir 61 is provided in a piston 62. The piston 62 corresponds to the piston 12a in the second preferred embodiment, and thus the reservoir 61 is also formed in each of the other pistons. The piston 62 includes therein a piston member 63 which is slidably received in the piston 62 so as to define the reservoir 61 in the piston 62. The piston 62 further includes a cap 67 which fixedly closes an open end of the piston 62 remote from a piston chamber or a working chamber C. A compression spring 64 is disposed in the piston 62 between the piston member 63 and the cap 67 so as to bias the piston member 63 in a direction to reduce a capacity of the reservoir 61. An inflow port 65 is formed on a side of the piston 62 which is connected to the inflow branch line 6a via an inflow line 66. With this structure, since the separate provision of the reservoir 51 is not necessary, the entire structure can be further made smaller.

In the foregoing first and second preferred embodiments, although the single wheel 16 is shown in the corresponding figures, the system also controls the braking of another wheel on the opposite side of the vehicle in the same manner as described above.

Further, in the first and second preferred embodiments, the control system may have three channels so as to independently control hydraulic brake pressures for a front-left wheel, a front-right wheel and rear wheels. Similarly, the control system may have four channels so as to independently control hydraulic pressures for the four wheels.

Figure 10:
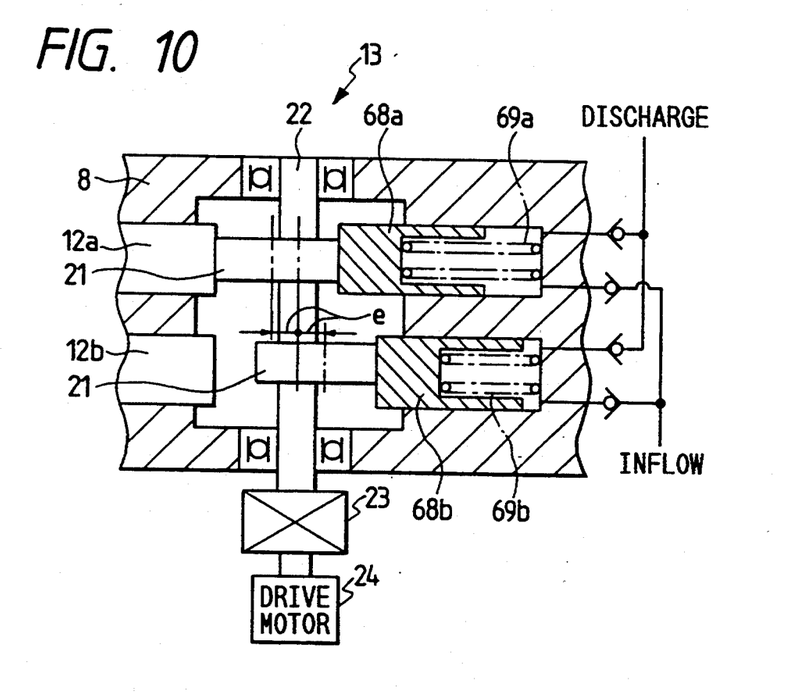
FIG. 10 is a schematic structural diagram showing a main portion of a further modification of the first or second preferred embodiment.

Further, in the first and second preferred embodiments, another system, such as, a traction control system may be added by sharing the operation control mechanism 13. For example, as shown in FIG. 10, by sharing the drive motor 24, the reduction gear mechanism 23, the eccentric cams 21 and the pump shaft 22 and by additionally providing pistons 68a and 68b, return springs 69a and 69b for respectively biasing the pistons 68a and 68b toward the eccentric cams 21, 21, inflow valves and discharge valves, etc., another hydraulic source for the traction control system or the like can be formed. With this modification, noise of the entire system including the traction control system or the like can be reduced.

It is to be understood that this invention is not to be limited to the preferred embodiments and modifications described above, and that various changes and modifications may be made without departing from the spirit and scope of the invention as defined in the appended claims.

What is claimed is:

1. A hydraulic brake control system for a vehicle, comprising:
   a brake line for establishing communication between a master cylinder and a wheel cylinder;
   a return line bypassing at least a portion of said brake line;
   switching valve means for opening and closing said brake line and said return line;
   a plurality of pistons arranged in said return line, said pistons each having a working state and a non-working state for allowing a brake fluid flowing from said switching valve means to be temporarily stored in a piston chamber corresponding to each of said pistons when each of said pistons is in said non-working state and for allowing the brake fluid to be discharged from said piston chamber corresponding to each of said pistons under pressure so as to flow into said master cylinder when each of said pistons is in said working state; and
   operation control means for controlling each of said pistons into said working state and said non-working state, respectively, in a predetermined order at a rate independent of a wheel rotation.

2. The system as set forth in claim 1, wherein said operation control means controls said pistons with a predetermined mutual phase difference.

3. The system as set forth in claim 2, wherein said predetermined phase difference is set to $2\pi/N$ (radian), wherein N represents the number of the pistons.

4. The system as set forth in claim 3, wherein a total amount of the brake fluid stored in said piston chambers is constant.

5. The system as set forth in claim 3, wherein said operation control means comprises a motor, a shaft connected to the motor and eccentric cams in the number of N mounted to said shaft, and wherein said eccentric cams are mounted to said shaft with a phase difference in eccentricity of $2\pi/N$ (radian).

6. The system as set forth in claim 5, wherein an eccentric amount of each of said eccentric cams is set to ½ of a discharge stroke of each of said pistons.

7. The system as set forth in claim 5, wherein said shaft is connected to said motor via reduction gear means.

8. The system as set forth in claim 5, wherein a rotational speed of said shaft is set to about 1 rotation/sec.

9. The system as set forth in claim 3, wherein said operation control means comprises hydraulic cylinders having strokes, said hydraulic cylinders operationally engaged to each of said pistons.

10. The system as set forth in claim 9, wherein said strokes are equal to one half of a discharge stroke of each of said pistons.

11. The system as set forth in claim 9, wherein a frequency of said hydraulic cylinders is approximately one stroke/sec.

12. The system as set forth in claim 1, wherein an inflow valve is provided between said switching valve means and each of said piston chambers, and wherein a valve opening pressure of said inflow valve is variably controlled.

13. The system as set forth in claim 12, wherein each of said inflow valves includes a movable valve member and a spring which biases said movable valve member toward a valve closing position, and wherein said valve opening pressure is variably controlled by changing a set load of said spring.

14. The system as set forth in claim 1, wherein a brake fluid reservoir is further provided in said return line between said switching valve means and said piston chambers.

15. The system as set forth in claim 14, wherein said brake fluid reservoir includes a reservoir tank having therein a reservoir tank piston and a spring which biases said reservoir tank piston in such a direction as to prevent the brake fluid in the return line from entering said reservoir tank.

16. The system as set forth in claim 1, wherein each of said pistons is provided therein with a reservoir, said reservoirs working to temporarily store the brake fluid therein in addition to said piston chambers.

17. The system as set forth in claim 1, wherein a hydraulic source for a traction control system is further provided by sharing said operation control means.

18. A hydraulic brake control system for a vehicle, comprising:
 a brake line for establishing communication between a master cylinder and a wheel cylinder;
 a return line bypassing at least a portion of said brake line;
 switching valve means for opening and closing said brake line and said return line;
 a plurality of pistons arranged in said return line, said pistons each having a working state and a non-working state for allowing a brake fluid flowing from said switching valve means to be temporarily stored in a piston chamber corresponding to each of said pistons when each of said pistons is in said non-working state and for allowing the brake fluid to be discharged from said piston chamber corresponding to each of said pistons under pressure so as to flow into said master cylinder when each of said pistons is in said working state; and
 operation control means for controlling each of said pistons into said working state and said non-working state, respectively, in a predetermined order, said operation control means comprising a shaft with eccentric cams mounted thereon for co-rotation therewith, and wherein each of said pistons includes an outer member, an inner member and a spring disposed therebetween for biasing said outer member in a direction to reduce said piston chamber and said inner member in an opposite direction toward corresponding one of said eccentric cams so as to allow said inner member to follow a contour of said eccentric cam.

19. The system as set forth in claim 18, wherein a buffer member is interposed between said outer and inner members of each of said pistons.

20. A hydraulic brake control system for a vehicle, comprising:
 a brake line extending from a master cylinder to a wheel cylinder for applying a pressure in said master cylinder to said wheel cylinder;
 a return line extending from said wheel cylinder to said master cylinder for a pressure reduction in said wheel cylinder;
 switching valve means for opening and closing said brake line and said return line;
 cylinders arranged in said return line;
 pistons each movably disposed in corresponding one of said cylinders for defining a piston chamber therein, each of said pistons having a first state where a brake fluid flowing from said wheel cylinder via said switching valve means is allowed to flow into said piston chamber, and a second state where the brake fluid is allowed to be discharged from said piston chamber so as to flow into said master cylinder; and
 operation control means for controlling each of said pistons into said first state and said second state, respectively, at different timings in turn at a rate independent of a wheel rotation.

21. The system as set forth in claim 20, wherein said return line partly bypasses said brake line.

22. The system as set forth in claim 20, wherein said return line includes therein branch lines which are arranged in parallel with each other, and wherein each of said branch lines includes therein corresponding one of said cylinders.

23. The system as set forth in claim 22, wherein each of said branch lines includes an inflow line connected to said switching valve means and a discharge line connected to said master cylinder, and wherein said cylinder is arranged between said inflow line and said discharge line.

24. A hydraulic brake control system for a vehicle, comprising:
 a brake line for establishing communication between a master cylinder and a wheel cylinder;
 a return line bypassing at least a portion of said brake line;
 switching valve means for opening and closing said brake line and said return line;
 a cylinder block having a plurality of piston chambers therein arranged in said return line;
 a plurality of pistons operationally disposed within said plurality of piston chambers, said pistons each having a working state and a non-working state for allowing a brake fluid flowing from said switching valve means to be temporarily stored in the piston chambers corresponding to each of said pistons when each of said pistons is in said non-working state and for allowing the brake fluid to be discharged from said piston chambers corresponding to each of said pistons under pressure so as to flow into said master cylinder when each of said pistons is in said working state;
 a plurality of inflow valves, each disposed in said cylinder block between said switching valve means and each of said piston chambers, respectively, each of said inflow valves including a movable valve member and a biasing member which biases said movable member toward a valve closing position, said biasing member being disposed between said movable valve member and a cam follower on a cam; and
 operation control means for controlling each of said pistons into said working state and said non-working state, respectively, in a predetermined order, said operation control means having a motor and a shaft connected operationally to said motor, said cam corresponding to each of said inflow valves being mounted on said shaft for co-rotation therewith so as to change a set load of the biasing member corresponding to each of said inflow valves via said cam follower.

* * * * *